Patented Feb. 26, 1952

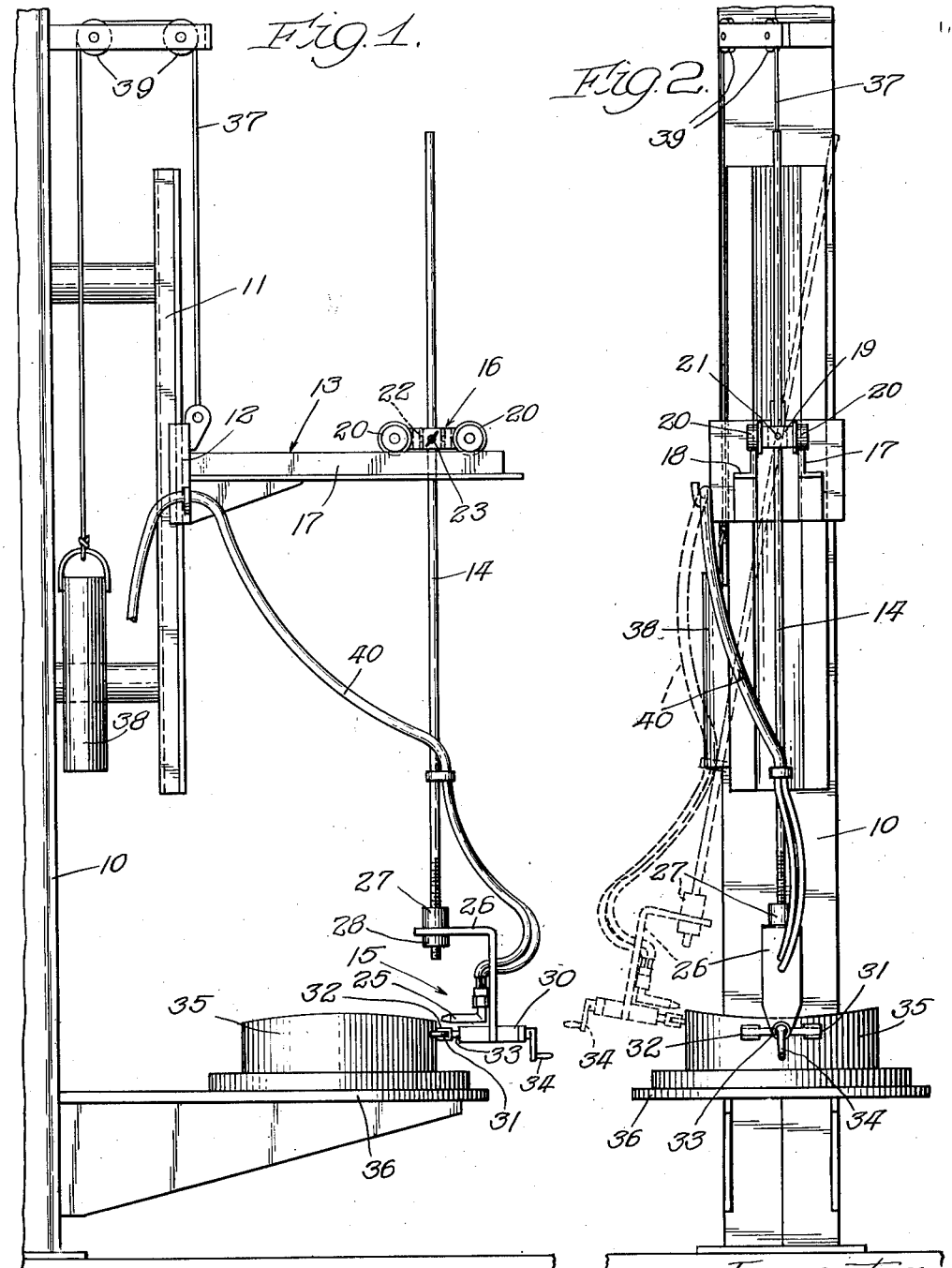

2,586,824

UNITED STATES PATENT OFFICE 2,586,824

PIPE CUTTING APPARATUS

James Leo Hunt, Birmingham, Ala., assignor to Chicago Bridge & Iron Company, a corporation of Illinois Application May 16, 1949, Serial No. 93,621

6 Claims. (Cl. 33—21)

This invention relates to a cutting apparatus and more particularly to an apparatus for cutting a cylinder to fit a non-planar surface.

Many types of structures, for example, cylindrical tanks, are provided with surfaces which are non-planar. In welding a second cylindrical member to the side of the tank it is necessary to cut the end of the second cylinder to a shape which will conform to the shape of the tank to provide a flush joint. Previous apparatuses for performing this operation have for the most part been complicated in design, particularly where designed to cut large cylindrical pipes. Furthermore, previous devices were very difficult to adjust when used for cutting various sizes of cylinders to fit surfaces having various radii of curvature.

I have invented and am herein disclosing and claiming a cutting jig by means of which the end of a pipe or cylinder may easily be cut to conform to the shape of the sides of a second larger cylinder. The apparatus is readily adjustable to execute cuts which will fit a cylinder of any particular curvature.

The invention will be described in conjunction with the specific embodiment shown in the accompanying drawing in which Fig. 1 is a side elevation of the cutting jig and Fig. 2 is a front elevation of the apparatus shown in Fig. 1.

Referring now to the drawings, 10 indicates a supporting means for a vertical track 11 upon which a block 12 is slidable. Mounted upon the block is a support 13 for an arm 14. A cutter 15 is secured to the lower end of the arm.

The support 13 provides a guideway for a carriage 16, the guideway comprising spaced tracks 17 and 18 extending horizontally outward from the block 12. The carriage comprises a pair of end blocks 19 which are provided with axles for wheels 20 thereon, the wheels being adapted to roll along the tracks 17 and 18. Rotatably mounted in and extending between the end blocks is a frame member 21. The frame is provided with a hole 22 through which the arm 14 extends and in which the arm is supported by means of a set screw 23 threaded into the frame and adapted to bear against the arm. Being so mounted, the arm 14 is adjustable in length and is suspended from the carriage 16 in a manner permitting it to swing from the carriage, but only in vertical planes intersecting the path of movement of the carriage at right angles.

In the exemplary embodiment shown, the cutter 15 comprises a torch 25 mounted upon a bracket 26 rotatably secured to the arm 14 between threaded blocks 27 and 28. Mounted on the lower end of the bracket 26 is a spacing device 30 which includes a pair of wheels 31 mounted for rotation in a bracket 32 affixed to one end of a rod 33. Inward and outward movement of the rod 33 is achieved by rotating a handle 34 on the spacing device, rotation of the handle being adapted to rotate a threaded member within the device 30 to move the rod 33 inwardly and outwardly and hence to adjust the position of the nozzle of the torch preparatory to cutting a cylindrical member 35. The cylindrical member is positioned upon a base 36 secured to the supporting means 10.

The block 12, as previously stated, is slidable vertically upon the track 11 and means are provided for maintaining the support 13 at any adjusted elevation. In the specific embodiment shown the means comprise a cable 37 having one end secured to the block 12 and having its other end secured to a weight 38. From the block 12 the cable passes upwardly over sheaves 39 and thence downwardly to the weight. The usual gas lines 40 are provided which lead from a source of gas (not shown) to the cutting torch 25.

In the operation of the cutting device a cylinder 35 which is to be cut is positioned upon the base 36 directly beneath the support 13 so that the central axis of the cylinder 35 intersects the path of movement of the carriage 16. The length of the arm between the frame 21 and the torch 25 is then adjusted so as to correspond to the radius of curvature of the surface to which the member 35 is to be fitted. The location of the torch 25 with respect to the desired cutting area of the member 35 is then adjusted by means of raising or lowering the block 12. On the initial cut, the vertical center line of the row 14 is directly over the outside surface of the cylinder 25, as shown.

With the torch in operation and properly spaced from the member 35, the cutting device may then be moved slowly around the cylinder 35, keeping the torch aimed directly at the surface thereof. With the torch in the position shown in Fig. 1 and in the full lines of Fig. 2, the arm 14 hangs vertically from the carriage. As the torch is moved slowly to the left around the member 35, the carriage 16 moves inwardly (to the left as seen in Fig. 1) to keep pace therewith and at the same time the arm 14 is swung away from the vertical position until, at a point 90° from the position shown in Fig. 1, the torch will have reached the position shown in the dotted lines of Fig. 2. At this point the carriage 16 will have moved a distance equal to one-half of the outside diameter of the member 35 and at the same time the arm 14 will have been swung in a vertical plane to its maximum extent for the particular piece undergoing cutting. As movement of the torch around the member 35 continues, the arm 14 approaches a vertical position again and the carriage continues to move to the left until the cutting device has reached a point 180° from the point shown in Fig. 1. Continued movement of the cutter around the member 35 will cause the cutter and arm to follow similar paths as the balance of the cutting is accomplished.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus for cutting a cylinder to fit a nonplanar surface comprising a support parallel to the work, an arm suspended from the support and movable along the support in a linear path, said arm being suspended from the support for swinging movement only in planes intersecting said path at right angles, a cutter on the lower end of the arm, a base beneath the support for supporting the cylinder, means for varying the length of the arm, and means for varying the vertical distance between the base and the support.

2. Apparatus of the character described in claim 1 in which said cutter is mounted for rotation about a substantially vertical axis.

3. Apparatus of the character described in claim 1 in which said support comprises a substantially horizontal guideway and including a carriage movable along the guideway, with the arm being suspended from the carriage.

4. Apparatus of the character described in claim 3 in which said guideway comprises spaced tracks and in which said carriage is provided with wheels rolling on said tracks, said arm being suspended from the carriage in the space between the tracks.

5. Apparatus for cutting a cylinder to fit a non-planar surface comprising a substantially horizontal guideway, a carriage movable in a linear path along the guideway, an arm swingably suspended from the carriage for swinging movement only in planes intersecting said path at right angles, a cutter on the lower end of the arm, a base beneath the guideway for supporting the cylinder in a position wherein the central longitudinal axis of the cylinder intersects the linear path, means for varying the length of the arm, and means for varying the vertical distance between the base and the guideway.

6. Apparatus of the character described in claim 5 in which said cutter is a torch mounted for rotation in a plane perpendicular to the arm and including spacing wheels mounted on the lower end of the arm for spacing the torch from the cylinder.

JAMES LEO HUNT.

REFERENCES CITED

The following references are of record in the file of this patent:

UNITED STATES PATENTS

| Number | Name | Date |
|---|---|---|
| 2,384,128 | Nation | Sept. 4, 1945 |